United States Patent

Yang et al.

(10) Patent No.: US 8,890,834 B2
(45) Date of Patent: Nov. 18, 2014

(54) SCANNING METHOD OF A TOUCH PANEL

(75) Inventors: Yi-Long Yang, Tainan County (TW);
Yaw-Guang Chang, Tainan County (TW)

(73) Assignee: Himax Technologies Limited, Tainan (TW)

( * ) Notice: Subject to any disclaimer, the term of this patent is extended or adjusted under 35 U.S.C. 154(b) by 643 days.

(21) Appl. No.: 12/759,381

(22) Filed: Apr. 13, 2010

(65) Prior Publication Data

US 2011/0248950 A1 Oct. 13, 2011

(51) Int. Cl.
*G06F 3/044* (2006.01)
*G06F 3/045* (2006.01)

(52) U.S. Cl.
CPC ............. *G06F 3/044* (2013.01); *G06F 3/045* (2013.01)
USPC ........................................... 345/174

(58) Field of Classification Search
CPC .................. G06F 3/044; G06F 3/0416
USPC .......... 345/173–174; 178/18.06, 20.01–20.04
See application file for complete search history.

(56) References Cited

U.S. PATENT DOCUMENTS

| 5,793,303 | A | 8/1998 | Koga | |
|---|---|---|---|---|
| 7,598,949 | B2 * | 10/2009 | Han | 345/174 |
| 2006/0097991 | A1 * | 5/2006 | Hotelling et al. | 345/173 |
| 2009/0033638 | A1 | 2/2009 | Yamaguchi et al. | |
| 2010/0039396 | A1 * | 2/2010 | Ho et al. | 345/173 |
| 2010/0097343 | A1 * | 4/2010 | Fang | 345/174 |
| 2011/0080370 | A1 * | 4/2011 | Wu | 345/174 |
| 2012/0206407 | A1 * | 8/2012 | Taylor et al. | 345/174 |

OTHER PUBLICATIONS

"Office Action of Taiwan Counterpart Application," issued on Apr. 8, 2013, p. 1-p. 5, in which the listed references were cited.

* cited by examiner

*Primary Examiner* — Allison Johnson
(74) *Attorney, Agent, or Firm* — J.C. Patents

(57) ABSTRACT

A scanning method of a touch panel is provided. The touch panel has a horizontal channel group including a plurality of horizontal channels and a vertical channel group including a plurality of vertical channels. According to the scanning method, N channels may be scanned simultaneously, wherein the N channels are selected from the horizontal channel group or the vertical channel group, the N channels are not adjacent to each other, N is a positive integer, and N is less than a channel amount of the selected channel group. Thereby, the scanning speed and the sensing accuracy of the touch panel using the scanning method are enhanced.

5 Claims, 4 Drawing Sheets

| PIN | ADC | PIN | ADC |
|---|---|---|---|
| CH1 | ADC1-1 | CH13 | ADC4-4 |
| CH2 | ADC2-1 | CH14 | ADC3-4 |
| CH3 | ADC3-1 | CH15 | ADC2-4 |
| CH4 | ADC4-1 | CH16 | ADC1-4 |
| CH5 | ADC4-2 | CH17 | ADC1-5 |
| CH6 | ADC3-2 | CH18 | ADC2-5 |
| CH7 | ADC2-2 | CH19 | ADC3-5 |
| CH8 | ADC1-2 | CH20 | ADC4-5 |
| CH9 | ADC1-3 | CH21 | ADC4-6 |
| CH10 | ADC2-3 | CH22 | ADC3-6 |
| CH11 | ADC3-3 | CH23 | ADC2-6 |
| CH12 | ADC4-3 | CH24 | ADC1-6 |

FIG. 2

SCANNING METHOD OF A TOUCH PANEL

BACKGROUND OF THE INVENTION

1. Field of the Invention

The invention is related to a scanning method of a touch panel, and more particularly, to a scanning method has both rapid scanning speed and high sensing accuracy.

2. Description of Related Art

With the technological development of touch panels, the touch panels are commonly applied in the screen of electric devices such as a mobile phone, a note book, or a table PC. A user performs an input action or an operation through the touch panel so that the user interface is more friendly and much convenient to the user. At present, multi-touch touch panels have become the mainstream in the market, wherein famous companies such as Apple Inc. and Microsoft Inc. have produced related products. Owing to the support of the famous companies, the application of the touch panels is broadened in various aspects such as portable communicating device, automation office equipment, medical and healthy treatment, finance/business, industry, or video games.

Presently, the common touch panels are mainly divided into resistive touch panels and capacitive touch panels. The resistive touch panels are applied in single-touch touch panels, which have low cost, and the capacitive touch panels are applied in multi-touch touch panels, which have the multi-touch function.

The sensing chip used in a multi-touch touch panel usually uses a plurality of analog-to-digital converters (ADCs) to convert the signals into digital signals for reading and adjusting by a back-end circuit. With the enlargement of the size of the touch panels, the channel amount and the length of each channel are increased to cause the difficulty of the circuit layout and have influence on the sensing accuracy.

SUMMARY OF THE INVENTION

The invention provides a scanning method of a touch panel having the effect of increasing the scanning speed and enhancing the sensing accuracy, and the disposition of the ADCs and the channel layout can be optimized according to the scanning method.

The invention provides a scanning method of a touch panel having a horizontal channel group and a vertical channel group. The horizontal channel group has a plurality of horizontal channels and the vertical channel group has a plurality of vertical channels. The scanning method includes simultaneously scanning N channels selected from a first channel group, wherein the first channel group is the horizontal channel group or the vertical channel group, the N channels are not adjacent to each other, N is a positive integer, and N is less than a channel amount of the channels belonging to the first channel group.

In an embodiment of the invention, the scanning method further includes the following steps: sequentially scanning all channels belonging to the first channel group, and scanning a second channel group after scanning the all channels belonging to the first channel group. When the first channel group is the horizontal channel group, the second channel group is the vertical channel group and when the first channel group is the vertical channel group, the second channel group is the horizontal channel group.

In an embodiment of the invention, the step of sequentially scanning the all channels belonging to the first channel group further includes scanning even channels and then scanning odd channels or scanning odd channels and then scanning even channels.

In an embodiment of the invention, the step of scanning the second channel group includes simultaneously scanning N channels belonging to the second channel group, wherein the N channels are not adjacent to each other.

In an embodiment of the invention, the N channels simultaneously scanned are even channels or odd channels. The N channels can be scanned simultaneously by N ADCs. The N ADCs can be respectively conducted to the corresponding horizontal channels and the corresponding vertical channels in a predetermined scanning sequence.

In view of the above, a plurality of ADCs are used to simultaneously scan a plurality of channels which are not adjacent to each other in the invention so as to increase the scanning speed and enhance the sensing accuracy.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2 and FIG. 3 show the connection relationships between the ADCs 122 to 128 and the pins CH1 to CH24 according to the first embodiment of the invention.

DESCRIPTION OF EMBODIMENTS

First Embodiment

Figure 1:
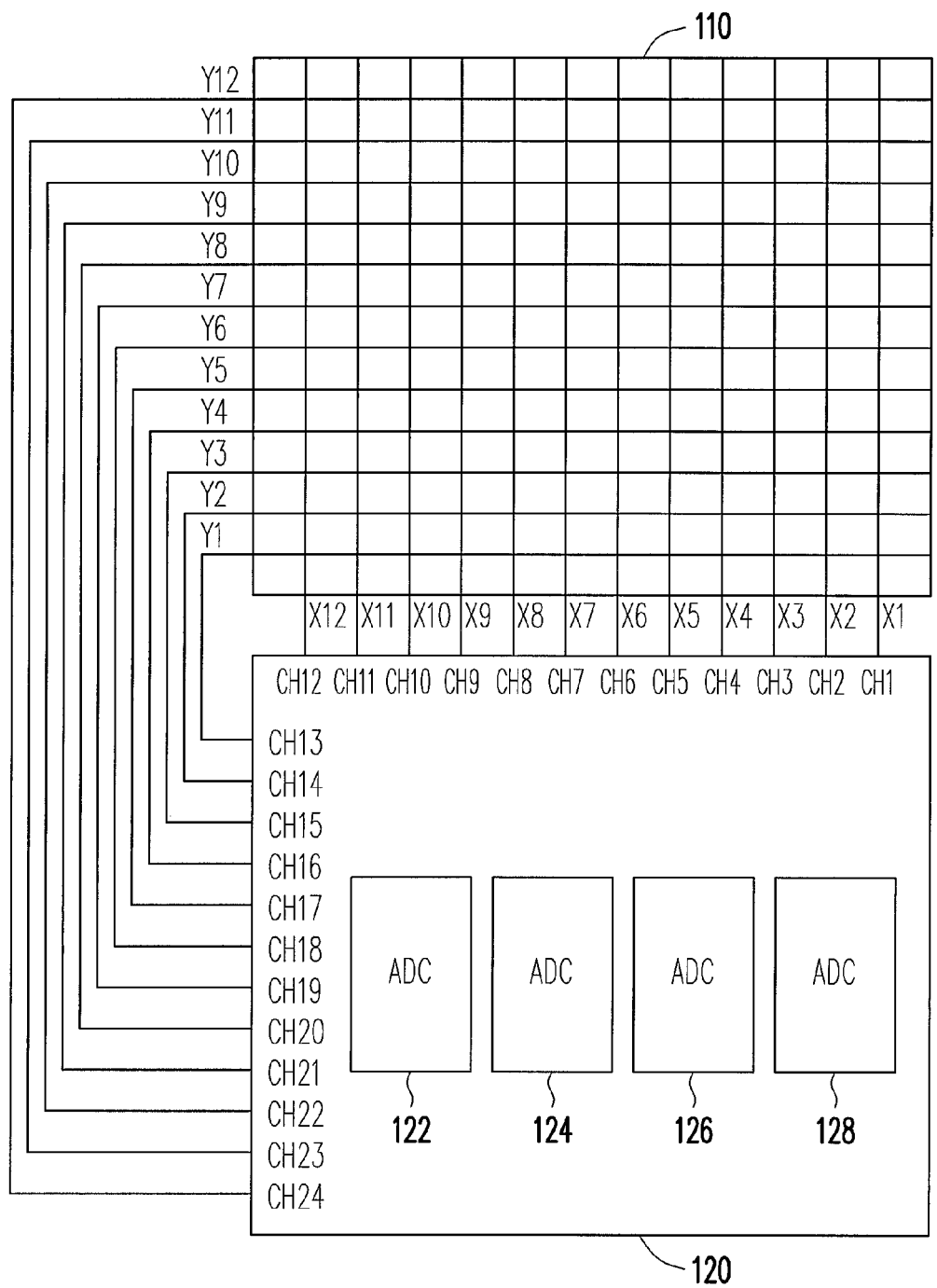
FIG. 1 is a schematic view of a touch panel according to a first embodiment of the invention.

Referring to FIG. 1 which is a schematic view of a touch panel according to a first embodiment of the invention, the touch panel 110 has a plurality of horizontal channels X1 to X12 and a plurality of vertical channels Y1 to Y12. The horizontal channels X1 to X12 are located at a side of the touch panel 110 to form a horizontal channel group. The vertical channels Y1 to Y12 are located at another side of the touch panel 110 to form a vertical channel group. A sensing unit 120 is coupled to the horizontal channels X1 to X12 and the vertical channels Y1 to Y12 through pins CH1 to CH24, respectively. A touch position on the touch panel is determined by the sensing unit 120 through scanning the horizontal channels X1 to X12 and the vertical channels Y1 to Y12. The sensing unit 120 has a plurality of ADCs 122 to 128 disposed on a printed circuit board and connected to the horizontal channels X1 to X12 and the vertical channels Y1 to Y12 so as to sense touch signals. The touch panel 110 has a plurality of sensing elements, such as capacitive sensing elements, disposed in an array in the panel, wherein the horizontal channels X1 to X12 and the vertical channels Y1 to Y12 are electrically connected to the sensing elements for outputting the touch signals.

Figure 3:
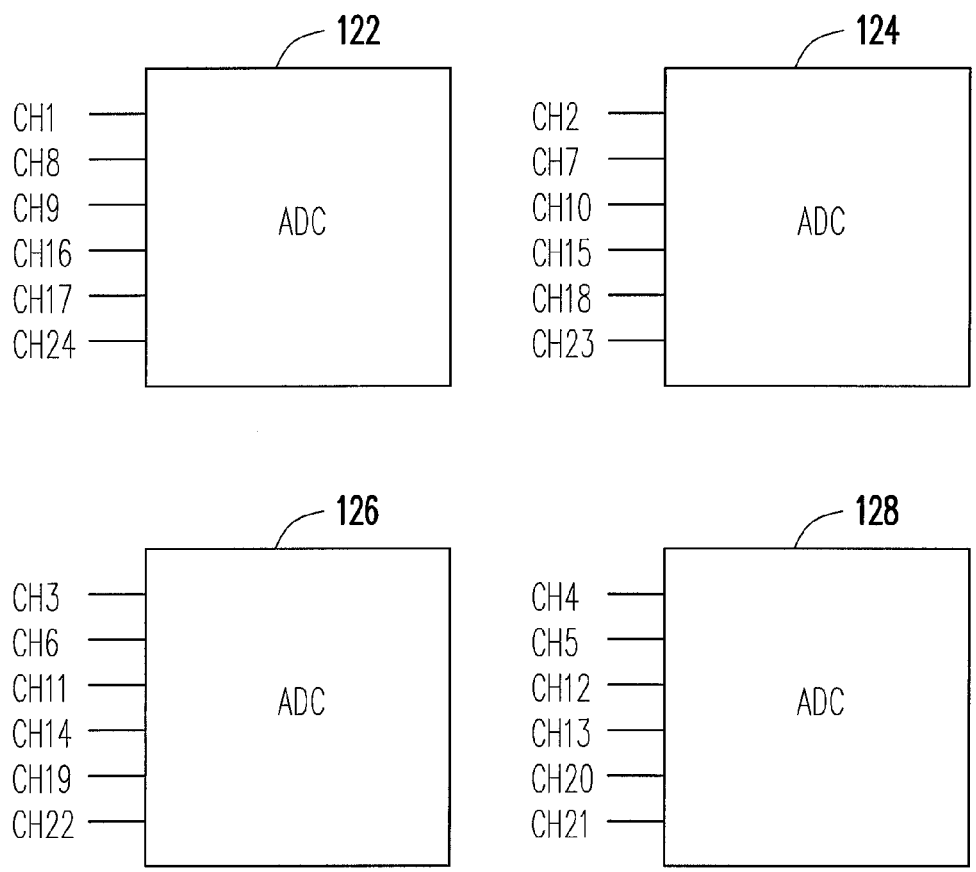

In the present embodiment, the layouts of the pins CH1 to CH24 connected to the horizontal channels X1 to X12 and the vertical channels Y1 to Y12 are not mutually penetrated as shown in FIG. 1 so that the sensing accuracy is not negatively influenced. Each of the ADCs 122 to 128 has six sensing pins (not shown) to connect to six channels. The ADCs 122 to 128 are respectively connected to the pins CH1 to CH24 in a predetermined scanning sequence to conduct to the corresponding horizontal channels X1 to X12 and the corresponding channels Y1 to Y12. The connection relationship between the sensing pins of the ADCs 122 to 128 and the pins CH1 to CH24 are referred to FIG. 2 and FIG. 3. FIG. 2 and FIG. 3 show the connection relationships between the ADCs 122 to 128 and the pins CH1 to CH24 according to the first embodiment of the invention. The sensing pins of the ADCs 122 to 128 are respectively represented by ADC1-1 to ADC1-6, ADC2-1 to ADC2-6, ADC3-1 to ADC3-6, and ADC4-1 to ADC4-6. Taking the pins CH1 to CH4 as an example, the pins CH1 to CH4 are respectively connected to first sensing pins of the ADC 122 to 128, i.e. ADC1-1, ADC2-1, ADC3-1, and ADC4-1. The connection relationships between other ADCs 122 to 128 and the pins CH1 to CH24 are referred to FIG. 2 and are not further reiterated. FIG. 3 shows the connection relationships between the ADCs 122 to 128 and the pins CH1 to CH24.

By the disposition shown in FIG. 2 and FIG. 3, the sensing unit 120 can simultaneously use the ADCs 122 to 128 to sense the horizontal channels X1 to X12 and the vertical channels Y1 to Y12 in the touch panel 110 and sequentially scan all channels in the touch panel 110 to determine the touch position.

Next, the method that the ADCs 122 to 128 scan the touch panel 110 is further described. During the scanning method, the ADCs 122 to 128 can simultaneously enable four channels which must be located at the same side of the touch panel 110 (i.e. the horizontal channels X1 to X12 or the vertical channels Y1 to Y12) and be not adjacent to each other. When the horizontal channels X1 to X12 are scanned first, the even channels such as the horizontal channels X2, X4, X6, and X8 are scanned by the ADC 122 to 128 and then the odd channels such as the horizontal channels X1, X3, X5, and X7 are scanned in the next scanning period, and vice versa. Through two scanning periods, the horizontal channels X1 to X8 are scanned and in the same scanning period, the horizontal channels scanned by the ADCs 122 to 128 are not adjacent to each other. The horizontal channels scanned in the same period are not adjacent to each other so that the sensing accuracy of the scanning method is enhanced by preventing from the interference during the scanning action.

Accordingly, two conditions are required when the ADCs 122 to 128 scan the touch panel 110:

The channels scanned in the same scanning period must be the channels belonging to the same group (the horizontal channel group or the vertical channels group), e.g. all of them are the horizontal channels or all of them are the vertical channels. The channels belonging to different groups can not simultaneously perform the sensing action.

The channels scanned in the same scanning period are not adjacent to each other.

In other words, when the sensing unit 120 has N ADCs, the sensing unit 120 can use the N ADCs to simultaneously scanning N channels. Nevertheless, the N channels are simultaneously the horizontal channels or simultaneously the vertical channels, the N channels are not adjacent to each other, N is a positive integer, and N is less than the channel amount of the horizontal channels or the vertical channels. The channels not adjacent to each other are exemplified as the even channels or the odd channels, but the present embodiment is not restricted herein. Merely the scanned channels in the same period are not adjacent to each other, can the scanning unit 120 scan the channels picking in various method such as picking inconsecutive orders of channels (e.g. picking the $2^{nd}$, $5^{th}$, $7^{th}$, and $11^{th}$ channels) according to the design requirement. The sensing accuracy can be enhanced by scanning all of the horizontal channels X1 to X12 and the vertical channels Y1 to Y12 through the aforesaid method.

In addition, it is noted that four ADCs 122 to 128, twelve horizontal channels X1 to X12, and twelve vertical channels Y1 to Y12 are taken as an example in the present embodiment, but the invention is not restricted herein. Those ordinary skilled in the art should be effortlessly able to infer other embodiments from the disclosure of the invention, and thus the various embodiments are not described and reiterated here.

Second Embodiment

Figure 4:
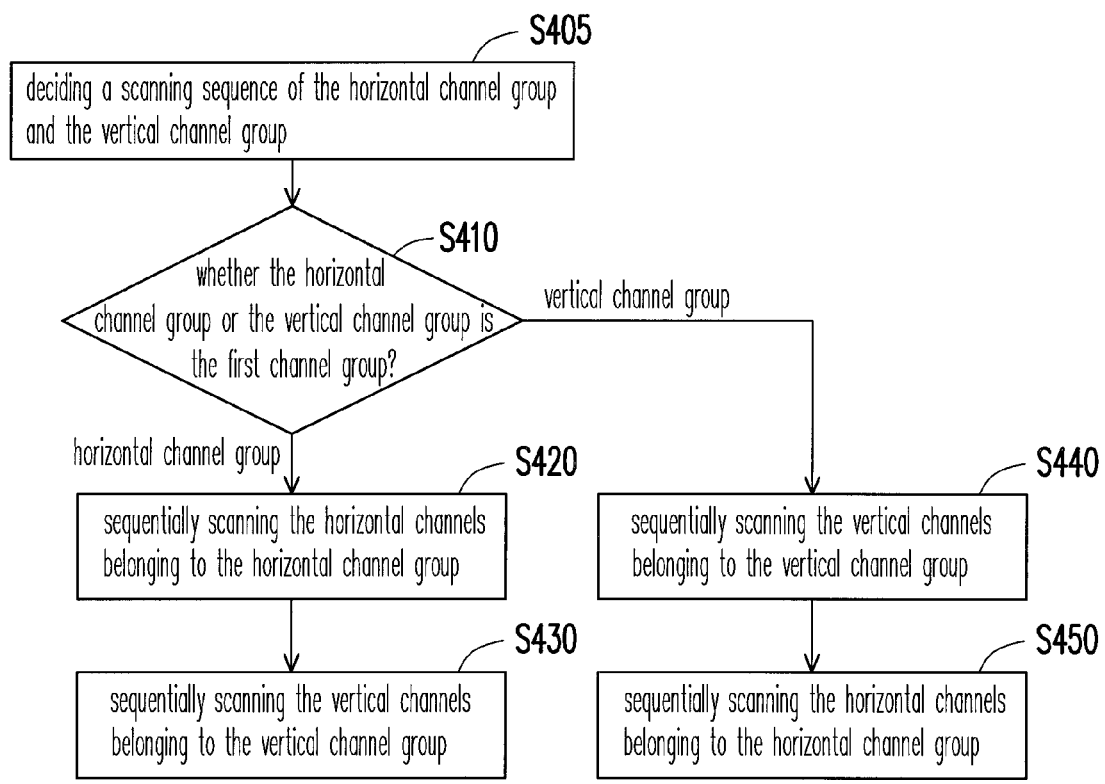
FIG. 4 is a flowchart showing a scanning method of a touch panel according to a second embodiment of the invention.

In the above embodiment, the channels belonging to the horizontal channel group are scanned by the sensing unit 120 prior to the channels belonging to the vertical channel group. In another embodiment of the invention, the channels belonging to the vertical channel group can be scanned by the sensing unit 120 prior to the channels belonging to the horizontal channel group. Next, FIG. 4 being a flowchart which shows a scanning method of a touch panel according to a second embodiment of the invention is also referred to. First, the scanning sequence of the horizontal channel group and the vertical channel group are decided (step S405), and then whether the horizontal channel group or the vertical channel group is the first channel group earlier scanned is adjusted (step S410). If the horizontal channel group is selected to be the first channel group, all the horizontal channels X1 to X12 belonging to the horizontal channel group are sequentially scanned (step S420), and then all the vertical channels Y1 to Y12 belonging to the vertical channel group are sequentially scanned (step S430). On the contrary, if the vertical channel group is selected to be the first channel group, the vertical channels Y1 to Y12 belonging to the vertical channel group are sequentially scanned (step S440) and then the horizontal channels X1 to X12 belonging to the horizontal channel group are sequentially scanned (step S450).

In the above steps S420 to S450, a plurality of channels can be simultaneously scanned by the sensing unit 120, but the channels simultaneously scanned are not adjacent to each other, such as the even channels or the odd channels. The scanning method can be referred to the description in FIG. 1 to FIG. 3. Those ordinary skilled in the art should be effortlessly able to infer the embodiment from the disclosure of the invention, and thus the embodiment is not described and reiterated here.

In summary, a scanning method of a touch panel is provided in the invention, wherein the horizontal channels and the vertical channels are not simultaneously scanned and the channels simultaneously scanned are not adjacent to each other. Thereby, the scanning speed and the sensing accuracy of the touch panel are enhanced. In addition, a plurality of ADCs are correspondingly disposed and connected to the horizontal channels and the vertical channels to simultaneously scan a plurality of channels according to the aforesaid scanning method.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A scanning method of a touch panel, the touch panel having a horizontal channel group and a vertical channel group, one of the horizontal channel group and the vertical channel group being referred as a first channel group and another one of the horizontal channel group and the vertical channel group being referred as a second channel group, wherein the horizontal channel group has a plurality of horizontal channels in consecutive sequence and the vertical channel group has a plurality of vertical channels in consecutive sequence, wherein the touch panel has N analog-to-digital converters (ADCs), N is a positive integer, and N is less than a channel amount of the first channel group, and the scanning method comprising:

connecting all channels of the first channel group in consecutive and one by one sequence to the N ADCs, wherein the N ADCs are counted from 1 to N and when a first set of N channels of the all channels of the first channel group are one by one connected to the N ADCs in a first consecutive sequence, a second set of N channels of the all channels of the first channel group just next to the first set are connected to the N ADCs in a second consecutive sequence reverse to the first consecutive sequence;

simultaneously scanning N channels of the first channel group through the N ADCs, respectively;

scanning the all channels belonging to the first channel group, comprising scanning consecutive even channels belonging to the first channel group and then scanning consecutive odd channels belonging to the first channel group, or scanning the consecutive odd channels and then scanning the consecutive even channels; and scanning the second channel group after scanning the all channels belonging to the first channel group, wherein when the first channel group is the horizontal channel group, the second channel group is the vertical channel group, and when the first channel group is the vertical channel group, the second channel group is the horizontal channel group, wherein the N channels being simultaneously scanned by the N ADCs are not consecutive for any adjacent two channels, wherein the step of scanning the all channels belonging to the first channel group further comprises scanning consecutive even channels belonging to the first channel group.

2. The scanning method of claim 1, wherein the step of scanning the second channel group comprises:

simultaneously scanning N channels belonging to the second channel group, wherein the N channels belonging to the second channel group are not adjacent to each other.

3. The scanning method of claim 1, wherein the N ADCs are conducted to the corresponding horizontal channels and the corresponding vertical channels in a predetermined scanning sequence.

4. A scanning method of a touch panel, the touch panel having a horizontal channel group and a vertical channel group, one of the horizontal channel group and the vertical channel group being referred as a first channel group and another one of the horizontal channel group and the vertical channel group being referred as a second channel group, wherein the horizontal channel group has a plurality of horizontal channels in consecutive sequence and the vertical channel group has a plurality of vertical channels in consecutive sequence, wherein the touch panel has N analog-to-digital converters (ADCs), N is a positive integer, and N is less than a channel amount of the first channel group, and the scanning method comprising:

connecting all channels of the first channel group in consecutive and one by one sequence to the N ADCs, wherein the N ADCs are counted from 1 to N and when a first set of N channels of the all channels of the first channel group are one by one connected to the N ADCs in a first consecutive sequence, a second set of N channels of the all channels of the first channel group just next to the first set are connected to the N ADCs in a second consecutive sequence reverse to the first consecutive sequence; and simultaneously scanning N channels of the first channel group through the N ADCs, respectively, wherein the N channels being simultaneously scanned by the N ADCs are not consecutive for any adjacent two channels, wherein the N channels are consecutive even channels.

5. A scanning method of a touch panel, the touch panel having a horizontal channel group and a vertical channel group, one of the horizontal channel group and the vertical channel group being referred as a first channel group and another one of the horizontal channel group and the vertical channel group being referred as a second channel group, wherein the horizontal channel group has a plurality of horizontal channels in consecutive sequence and the vertical channel group has a plurality of vertical channels in consecutive sequence, wherein the touch panel has N analog-to-digital converters (ADCs), N is a positive integer, and N is less than a channel amount of the first channel group, and the scanning method comprising:

connecting all channels of the first channel group in consecutive and one by one sequence to the N ADCs, wherein the N ADCs are counted from 1 to N and when a first set of N channels of the all channels of the first channel group are one by one connected to the N ADCs in a first consecutive sequence, a second set of N channels of the all channels of the first channel group just next to the first set are connected to the N ADCs in a second consecutive sequence reverse to the first consecutive sequence; and simultaneously scanning N channels of the first channel group through the N ADCs, respectively, wherein the N channels being simultaneously scanned by the N ADCs are not consecutive for any adjacent two channels, wherein the N channels are consecutive odd channels.

* * * * *